(12) United States Patent
Park et al.

(10) Patent No.: US 12,355,539 B2
(45) Date of Patent: Jul. 8, 2025

(54) BEAM TRAINING WITH MULTI-LINK OPERATION

(71) Applicant: Senscomm Semiconductor Co., Ltd., Suzhou (CN)

(72) Inventors: Sung Jin Park, Seoul (KR); Daehong Kim, Laguna Hills, CA (US)

(73) Assignee: Senscomm Semiconductor Co., Ltd., Suzhou (CN)

( * ) Notice: Subject to any disclaimer, the term of this patent is extended or adjusted under 35 U.S.C. 154(b) by 61 days.

(21) Appl. No.: 18/452,470

(22) Filed: Aug. 18, 2023

(65) Prior Publication Data

US 2024/0080082 A1    Mar. 7, 2024

Related U.S. Application Data

(60) Provisional application No. 63/510,843, filed on Jun. 28, 2023, provisional application No. 63/374,866, filed on Sep. 7, 2022.

(30) Foreign Application Priority Data

Aug. 11, 2023   (CN) .......................... 202311014117.0

(51) Int. Cl.
| | |
|---|---|
| *H04B 7/06* | (2006.01) |
| *H04W 16/28* | (2009.01) |
| *H04W 88/10* | (2009.01) |

(52) U.S. Cl.
CPC ....... *H04B 7/06952* (2023.05); *H04B 7/0617* (2013.01); *H04W 16/28* (2013.01); *H04W 88/10* (2013.01)

(58) Field of Classification Search
CPC . H04B 7/06952; H04B 7/0617; H04W 16/28; H04W 88/10; H04W 76/15; H04W 84/12
See application file for complete search history.

(56) References Cited

U.S. PATENT DOCUMENTS

| | | | |
|---|---|---|---|
| 2017/0033850 A1* | 2/2017 | Kasher | H04L 69/323 |
| 2017/0180025 A1* | 6/2017 | Cariou | H04W 52/04 |
| 2022/0159555 A1* | 5/2022 | Cariou | H04W 48/12 |

* cited by examiner

*Primary Examiner* — David S Huang
(74) *Attorney, Agent, or Firm* — BROADVIEW IP LAW, PC

(57) ABSTRACT

An access point (AP) multi-link device (MLD) is associated with a non-AP MLD. The non-AP MLD comprises a first station (STA) and a second STA. The AP MLD comprises a first AP affiliated with the AP MLD and associated with the first STA and a second AP affiliated with the AP MLD and associated with the second STA. The first AP sets up a first link with the first STA and the second AP sets up a second link with the second STA. The first link uses a millimeter wave band and the second link uses a frequency band below the millimeter wave band. The first AP transmits a beamforming training signal for the first link to the first STA and receives beamforming feedback information from the first STA when the second link is enabled.

10 Claims, 14 Drawing Sheets

EHT MU PPDU format

EHT TB PPDU format

BEAM TRAINING WITH MULTI-LINK OPERATION

CROSS-REFERENCE TO RELATED APPLICATIONS

This application claims benefit of U.S. Provisional Application No. 63/510,843 filed on Jun. 28, 2023, and U.S. Provisional Application No. 63/374,866 filed on Sep. 7, 2022, in the United States Patent and Trademark Office, and China Patent Application No. 2023110141170 filed on Aug. 11, 2023, in the China National Intellectual Property Administration, the entire contents of which are hereby incorporated by reference.

TECHNICAL FIELD

The disclosure relates to wireless communication systems, and more particularly to, for example, but not limited to, wireless communication devices for low latency.

BACKGROUND

The wireless local area network (WLAN) continues its growth and has become essential technology for providing wireless data services in different environments. In addition to the increased throughput and overall efficiency requirements as emerging and huge potential use cases, high reliability and low latency are being considered. The example of these use cases are Virtual Reality (VR) and Augmented Reality (AR), immersive gaming, remote office, and cloud-computing. Those cases require more challenging time-sensitive technologies.

The description set forth in the background section should not be assumed to be prior art merely because it is set forth in the background section. The background section may describe aspects or embodiments of the present disclosure.

SUMMARY

Embodiments allow the electronic devices to facilitate wireless communication. More particularly, embodiments allow the WLAN and wireless devices to increase throughput and reduce latency.

One aspect of the present disclosure may provide an access point (AP) multi-link device (MLD) associated with a non-AP MLD including a first station (STA) and a second STA, the AP MLD comprising: a first AP affiliated with the AP MLD and associated with the first STA; and a second AP affiliated with the AP MLD and associated with the second STA, wherein the first AP sets up a first link with the first STA, the second AP sets up a second link with the second STA, the first link uses a millimeter wave band, the second link uses a frequency band below the millimeter wave band, and the first AP transmits a beamforming training signal for the first link to the first STA and receives beamforming feedback information from the first STA when the second link is enabled.

The second AP transmits a beamforming training request for the first link to the second STA via the second link.

The beamforming training request may include beamforming training information for the first link.

The beamforming training information may include a start time of a beamforming training procedure for the first link.

The first AP may start the beamforming training procedure at the start time.

The second STA may transmit the beamforming training information to the first STA and the first STA wakes up at the start time.

The first AP may receive the beamforming feedback information from the second AP which receives the beamforming feedback information from the second STA via the second link.

The beamforming training signal may include a medium access control (MAC) address of the first STA.

The beamforming training signal may include a broadcast address.

The first AP may transmit the beamforming training signal for the first link to the first STA while the second AP exchanges a data frame with the second STA.

One aspect of the present disclosure may provide a non-access point (AP) multi-link device (MLD) associated with an AP MLD including a first AP and a second AP, the non-AP MLD comprising: a first station (STA) affiliated with the non-AP MLD and associated with the first AP; and a second STA affiliated with the non-AP MLD and associated with the second AP, wherein the first STA sets up a first link with the first AP, the second STA sets up a second link with the second AP, the first link uses a millimeter wave band, the second link uses a frequency band below the millimeter wave band, and the first STA receives a beamforming training signal for the first link from the first AP and receives beamforming feedback information to the first AP when the second link is enabled.

The second STA may receive a beamforming training request for the first link from the second AP via the second link.

The beamforming training request may include beamforming training information for the first link.

The beamforming training information may include a start time of a beamforming training procedure for the first link.

The first STA may start the beamforming training procedure at the start time.

The second STA may transmit the beamforming training information to the first STA and the first STA wakes up at the start time.

The first STA may send the beamforming feedback information to the second STA which transmits the beamforming feedback information to the second AP via the second link.

The beamforming training signal may include a medium access control (MAC) address of the first STA.

The beamforming training signal may include a broadcast address.

The first STA may receive the beamforming training signal for the first link from the first AP while the second STA exchanges a data frame with the second AP.

The payload information may include a PPDU type field indicating which payload information is included in the PHY preamble of the PPDU, if the control field indicates that the PHY preamble in the PPDU includes medium access control (MAC) information and the PPDU carries no data field.

DETAILED DESCRIPTION

Figure 1:
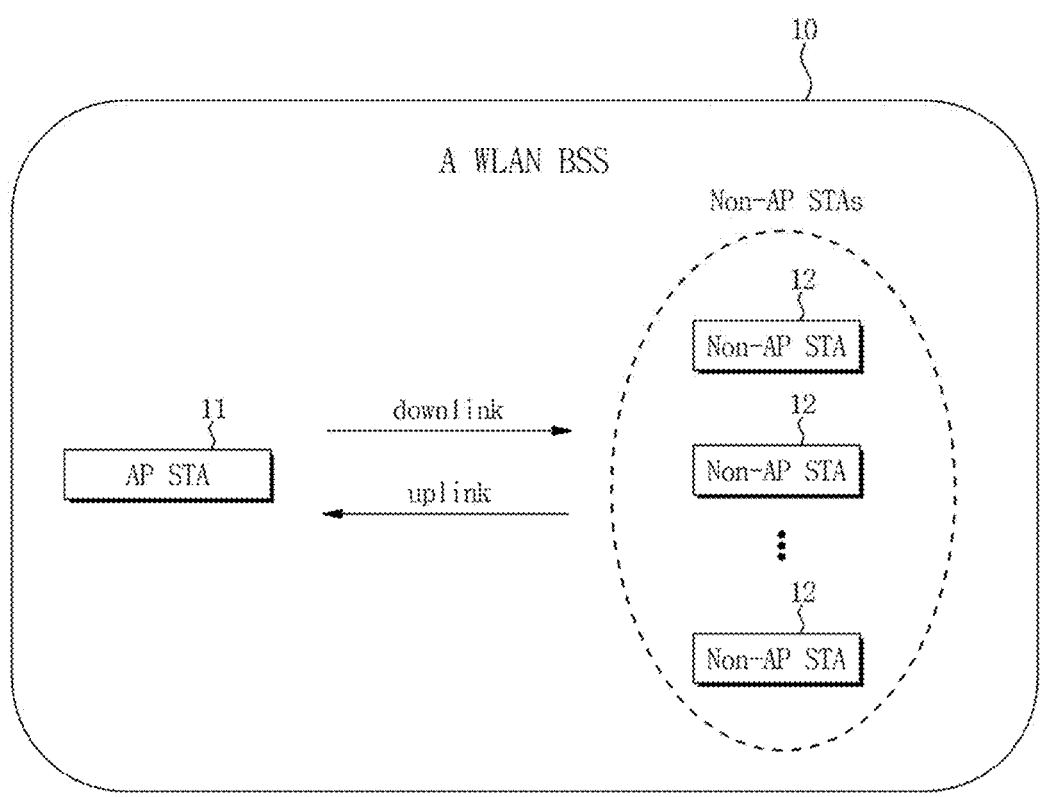
FIG. 1 illustrates a schematic diagram of an example wireless communication network.

The detailed description set forth below is intended to describe various implementations and is not intended to represent the only implementation. As those skilled in the art would realize, the described implementations may be modified in various different ways, all without departing from the scope of the present disclosure. Accordingly, the drawings and description are to be regarded as illustrative in nature and not restrictive. Like reference numerals designate like elements.

The below detailed description herein has been described with reference to a wireless LAN system according to the Institute of Electrical and Electronics Engineers (IEEE) 802.11 wireless standards including the current and future amendments. However, a person having ordinary skill in the art will readily recognize that the teachings herein are applicable to other network environments, such as cellular telecommunication networks and wired telecommunication networks.

In some embodiments, apparatus or devices such as an AP STA and a non-AP may include one or more hardware and software logic structure for performing one or more of the operations described herein. For example, the apparatuses or devices may include at least one memory unit which stores instructions that may be executed by a hardware processor installed in the apparatus and at least one processor which is configured to perform operations or processes described in the disclosure. The apparatus may also include one or more other hardware or software elements such as a network interface and a display device.

FIG. 1 illustrates a schematic diagram of an example wireless communication network.

Referring to FIG. 1, a basic service set (BSS) 10 may include a plurality of stations (STAs) including an access point (AP) station (AP STA) 11 and one or more non-AP station (non-AP STA) 12. The STAs may share a same radio frequency channel with one out of WLAN operation bandwidth options (e.g., 20/40/80/160/320 MHz). Hereinafter, in some embodiments, the AP STA and the non-AP STA may be referred as AP and STA, respectively. In some embodiments, the AP STA and the non-AP STA may be collectively referred as station (STA).

The plurality of STAs may participate in multi-user (MU) transmission. In the MU transmission, the AP STA 11 may simultaneously transmit the downlink frames to the multiple non-AP STAs 12 in the BSS 10 based on different resources and the multiple non-AP STAs 12 may simultaneously transmit the uplink frames to the AP STA 11 in the BSS 10 based on different resources.

For the MU transmission, multi-user multiple input, multiple output (MU-MIMO) transmission or orthogonal frequency division multiple access (OFDMA) transmission may be used. In MU-MIMO transmission, with one or more antennas, the multiple non-AP STAs 12 may either simultaneously transmit to the AP STA 11 or simultaneously receive from the AP STA 11 independent data streams over the same subcarriers. Different frequency resources may be used as the different resources in the MU-MIMO transmission. In OFDMA transmission, the multiple non-AP STAs 12 may either simultaneously transmit to the AP STA 11 or simultaneously receive from the AP STA 11 independent data streams over different groups of subcarriers. Different spatial streams may be used as the different resources in MU-MIMO transmission.

Figure 2:
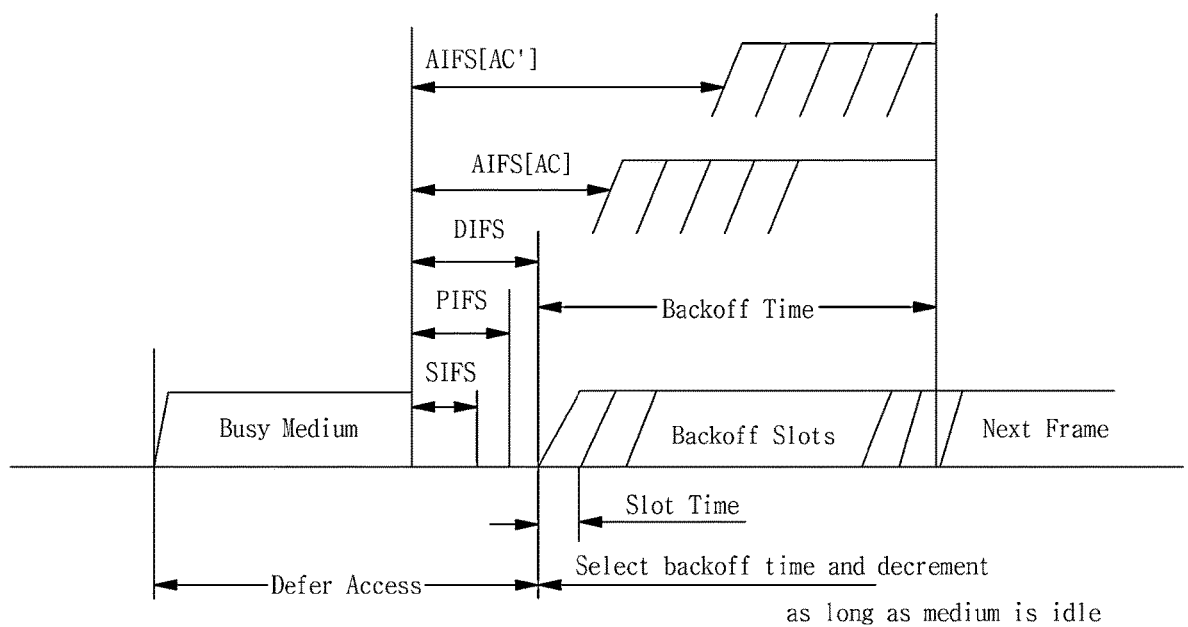
FIG. 2 illustrates an example of a timing diagram of interframe space (IFS) relationships between stations in accordance with an embodiment.

FIG. 2 illustrates an example of a timing diagram of interframe space (IFS) relationships between stations in accordance with an embodiment.

In particular, FIG. 2 shows a CSMA (carrier sense multiple access)/CA (collision avoidance) based frame transmission procedure for avoiding collision between frames in a channel.

A data frame, a control frame, or a management frame may be exchanged between STAs.

The data frame may be used for transmission of data forwarded to a higher layer. Referring to FIG. 2, access is deferred while the medium is busy until a type of IFS duration has elapsed. The STA may transmit the data frame after performing backoff if a distributed coordination function IFS (DIFS) has elapsed from a time when the medium has been idle.

The management frame may be used for exchanging management information which is not forwarded to the higher layer. Subtype frames of the management frame may include a beacon frame, an association request/response frame, a probe request/response frame, and an authentication request/response frame.

The control frame may be used for controlling access to the medium. Subtype frames of the control frame include a request to send (RTS) frame, a clear to send (CTS) frame, and an acknowledgement (ACK) frame. In the case that the control frame is not a response frame of the other frame, the STA may transmit the control frame after performing backoff if the DIFS has elapsed. If the control frame is the response frame of a previous frame, the WLAN device may transmit the control frame without performing backoff when a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC] has elapsed. In this case, the data frame, the management frame, or the control frame which is not the response frame may use the AIFC[AC].

In some embodiments, a point coordination function (PCF) enabled AP STA may transmit the frame after performing backoff if a PCF IFS (PIFS) has elapsed. The PIFS duration may be less than the DIFS but greater than the SIFS.

Figure 3:
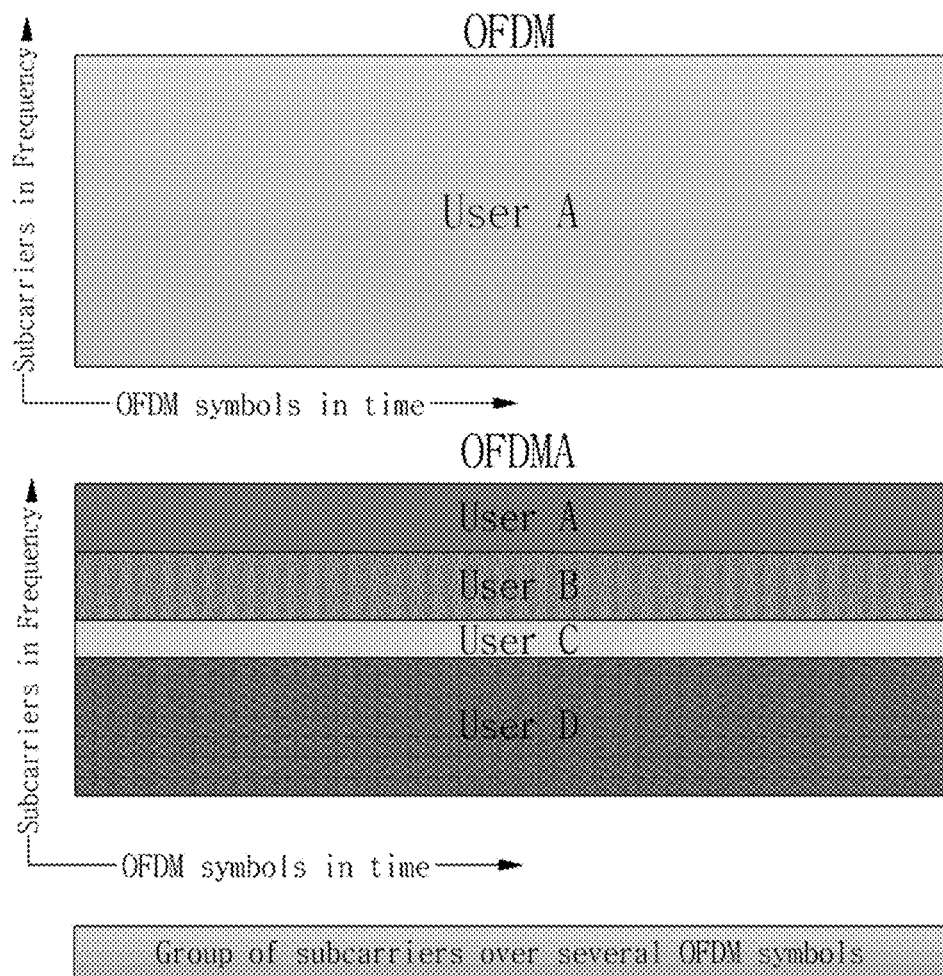
FIG. 3 shows an OFDM symbol and an OFDMA symbol in accordance with an embodiment.

FIG. 3 shows an OFDM symbol and an OFDMA symbol in accordance with an embodiment.

For multi-user access modulation, the orthogonal frequency division multiple access (OFDMA) for uplink and downlink has been introduced in IEEE 802.1 lax standard known as High Efficiency (HE) WLAN and will be used in 802.11's future amendments such as EHT (Extreme High Throughput). One or more STAs may be allowed to use one or more resource units (RUs) throughout operation bandwidth to transmit data at the same time. As the minimum granularity, one RU may comprise a group of predefined number of subcarriers and be located at predefined location in orthogonal frequency division multiplexing (OFDM) modulation symbol. Here, non-AP STAs may be associated or non-associated with AP STA when responding simultaneously in the assigned RUs within a specific period such as a short inter frame space (SIFS). The SIFS may refer to the time duration from the end of the last symbol, or signal extension if present, of the previous frame to the beginning of the first symbol of the preamble of the subsequent frame.

The OFDMA is an OFDM-based multiple access scheme where different subsets of subcarriers may be allocated to different users, allowing simultaneous data transmission to or from one or more users with high accurate synchronization for frequency orthogonality. In OFDMA, users may be allocated different subsets of subcarriers which can change from one physical layer (PHY) protocol data unit (PPDU) to the next. In OFDMA, an OFDM symbol is constructed of subcarriers, the number of which is a function of the PPDU bandwidth. The difference between OFDM and OFDMA is illustrated in FIG. 3.

In case of UL MU transmission, given different STAs with their own capabilities and features, the AP STA may want to have more control mechanism of the medium by using more scheduled access, which may allow more frequent use of OFDMA/MU-MIMO transmissions. PPDUs in UL MU transmission (MU-MIMO or OFDMA) may be sent as a response to the trigger frame sent by the AP. The trigger frame may have STA's information and assign RUs and multiple RUs (MRUs) to STAs. The STA's information in the trigger frame may comprise STA Identification (ID), MCS (modulation and coding scheme), and frame length. The trigger frame may allow an STA to transmit trigger-based (TB) PPDU (e.g., HE TB PPDU or EHT TB PPDU) which is segmented into an RU and all RUs as a response of Trigger frame are allocated to the solicited non-AP STAs accordingly. Hereafter, a single RU and a multiple RU may be referred to as the RU. The multiple RU may include, or consist of, predefined two, three, or more RUs.

In EHT amendment, two EHT PPDU formats are defined: the EHT MU PPDU and the EHT TB PPDU. Hereinafter, the EHT MU PPDU and the EHT TB PPDU will be described with reference to FIG. 4A and FIG. 4B.

Figure 4A:
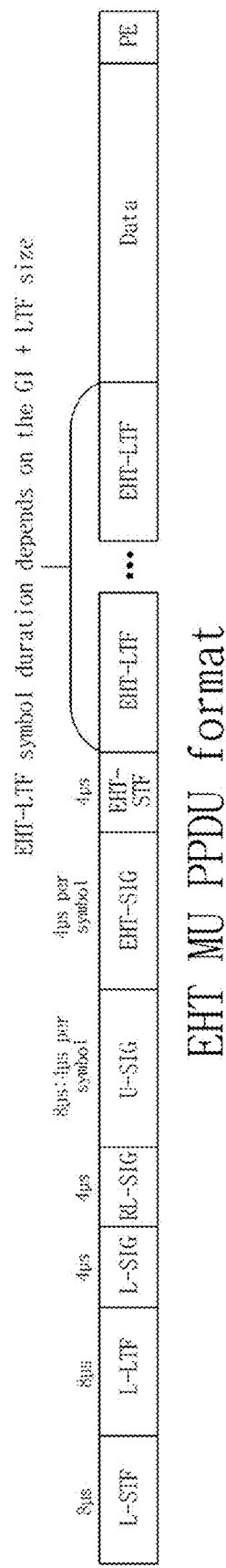
FIG. 4A illustrates the EHT MU PPDU format in accordance with an embodiment.

FIG. 4A illustrates the EHT MU PPDU format in accordance with an embodiment.

The EHT MU PPDU may be used for transmission to one or more users. The EHT MU PPDU is not a response to a triggering frame.

Referring to FIG. 4A, the EHT MU PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, a universal signal (U-SIG) field, and an EHT signal (EHT-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-SIG field immediately followed by the EHT-STF immediately followed by the EHT-LTF immediately followed by the data field immediately followed by the PE field.

The L-STF field may be utilized for packet detection, automatic gain control (AGC), and coarse frequency-offset correction.

The L-LTF field may be utilized for channel estimation, fine frequency-offset correction, and symbol timing.

The L-SIG field may be used to communicate rate and length information.

The RL-SIG field may be a repeat of the L-SIG field and may be used to differentiate an EHT PPDU from a non-HT PPDU, HT PPDU, and VHT PPDU.

The U-SIG field may carry information necessary to interpret EHT PPDUs.

The EHT-SIG field may provide additional signaling to the U-SIG field for STAs to interpret an EHT MU PPDU. Hereinafter, the U-SIG field, the EHT-SIG field, or both may be referred to as the SIG field.

The EHT-SIG field may include one or more EHT-SIG content channel. Each of the one or more EHT-SIG content channel may include a common field and a user specific field. The common field may contain information regarding the resource unit allocation such as the RU assignment to be used in the EHT modulated fields of the PPDU, the RUs allocated for MU-MIMO and the number of users in MU-MIMO allocations. The user specific field may include one or more user fields.

The user field for a non-MU-MIMO allocation may include a STA-ID subfield, a MCS subfield, a NSS subfield, a beamformed subfield, and a coding subfield. The user field for a MU-MIMO allocation may include a STA-ID subfield, a MCS subfield, a coding subfield, and a spatial configuration subfield.

The EHT-STF field may be used to improve automatic gain control estimation in a MIMO transmission.

The EHT-LTF field may enable the receiver to estimate the MIMO channel between the set of constellation mapper outputs and the receive chains.

The data field may carry one or more physical layer convergence procedure (PLCP) service data units (PSDUs).

The PE field may provide additional receive processing time at the end of the EHT MU PPDU.

Figure 4B:
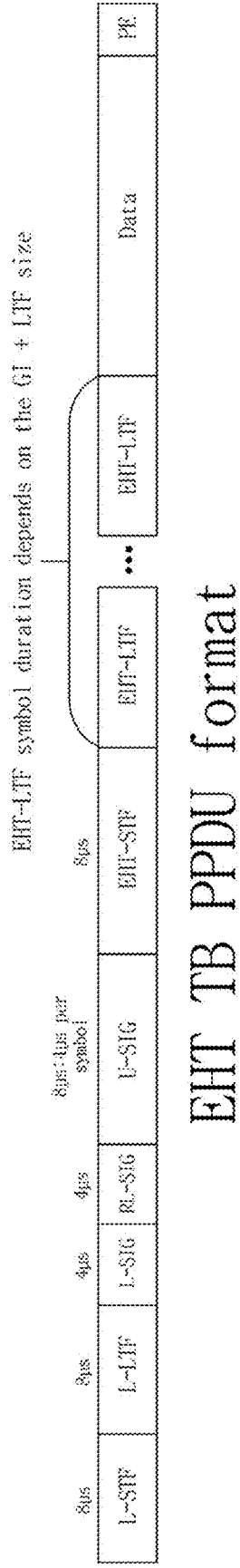
FIG. 4B illustrates the EHT TB PPDU format in accordance with an embodiment.

FIG. 4B illustrates the EHT TB PPDU format in accordance with an embodiment.

The EHT TB PPUD may be used for a transmission of a response to a triggering frame.

Referring to FIG. 4B, the EHT TB PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, and a universal signal (U-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-STF immediately followed by the EHT-LTF immediately followed by the data field immediately followed by the PE field. In the EHT TB PPDU, the EHT-SIG field is not present because the trigger frame conveys necessary information and the duration of the EHT_STF field in the EHT TB PPUD is twice the duration of the EHT-STF field in the EHT MU PPDU.

Description for each field in the EHT TB PPDU will be omitted because description for each field in the EHT MU PPDU is applicable to the EHT TB PPDU.

For EHT MU PPDU and EHT TB PPUD, when the EHT modulated fields occupy more than one 20 MHz channels, the pre-EHT modulated fields may be duplicated over multiple 20 MHz channels.

Hereinafter, electronic devices for facilitating wireless communication in accordance with various embodiments will be described with reference to FIG. 5.

Figure 5:
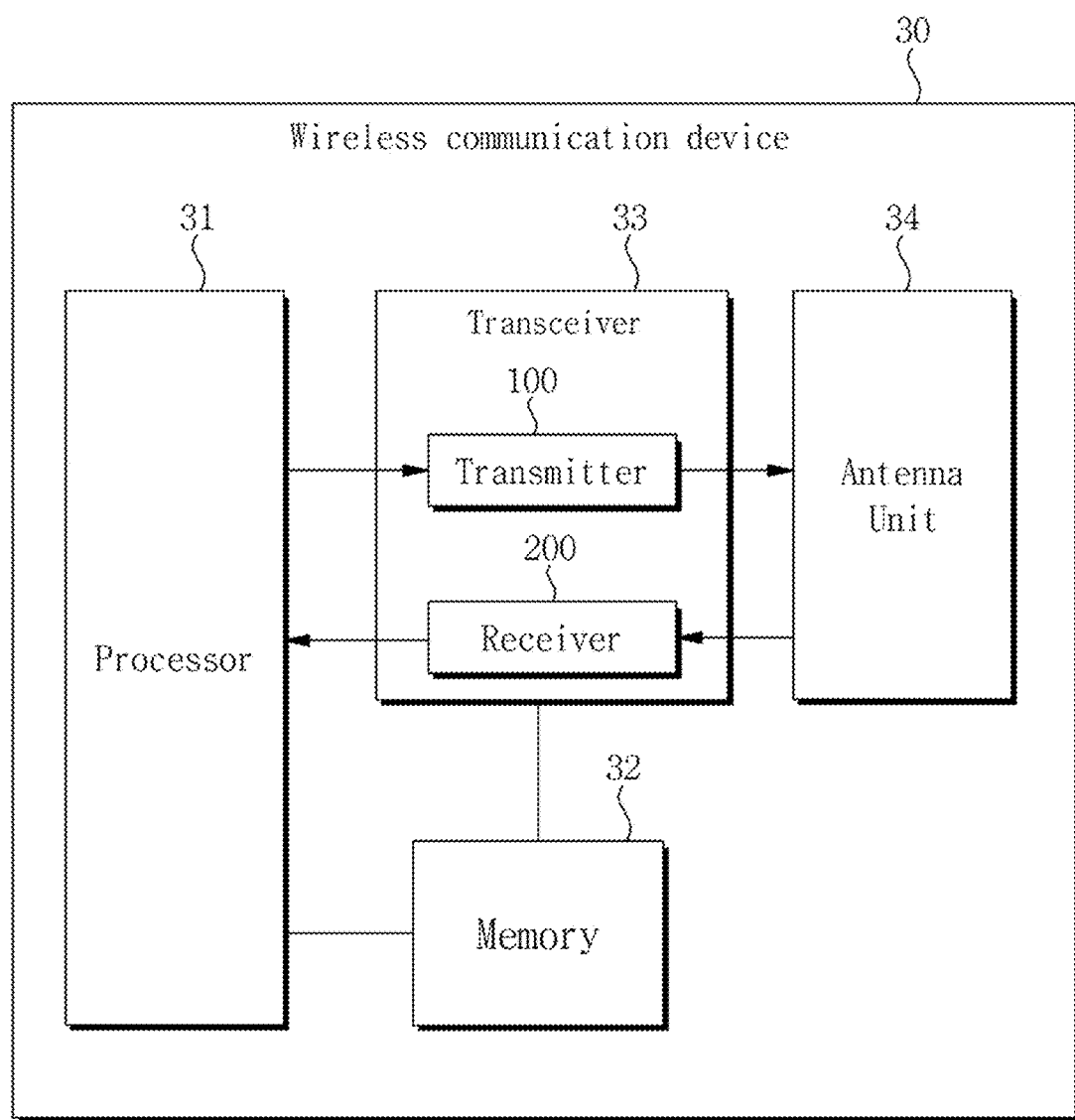
FIG. 5 is a block diagram of an electronic device for facilitating wireless communication in accordance with an embodiment.

FIG. 5 is a block diagram of an electronic device for facilitating wireless communication in accordance with an embodiment.

Referring to FIG. 5, an electronic device 30 for facilitating wireless communication in accordance with an embodiment may include a processor 31, a memory 32, a transceiver 33, and an antenna unit 34. The transceiver 33 may include a transmitter 100 and a receiver 200.

The processor 31 may perform medium access control (MAC) functions, PHY functions, RF functions, or a combination of some or all of the foregoing. In some embodiments, the processor 31 may comprise some or all of a transmitter 100 and a receiver 200. The processor 31 may be directly or indirectly coupled to the memory 32. In some embodiments, the processor 31 may include one or more processors.

The memory 32 may be non-transitory computer-readable recording medium storing instructions that, when executed by the processor 31, cause the electronic device 30 to perform operations, methods or procedures set forth in the present disclosure. In some embodiments, the memory 32 may store instructions that are needed by one or more of the processor 31, the transceiver 33, and other components of the electronic device 30. The memory may further store an operating system and applications. The memory 32 may comprise, be implemented as, or be included in a read-and-write memory, a read-only memory, a volatile memory, a non-volatile memory, or a combination of some or all of the foregoing.

The antenna unit 34 includes one or more physical antennas. When multiple-input multiple-output (MIMO) or multi-user MIMO (MU-MIMO) is used, the antenna unit 34 may include more than one physical antennas.

Figure 6:
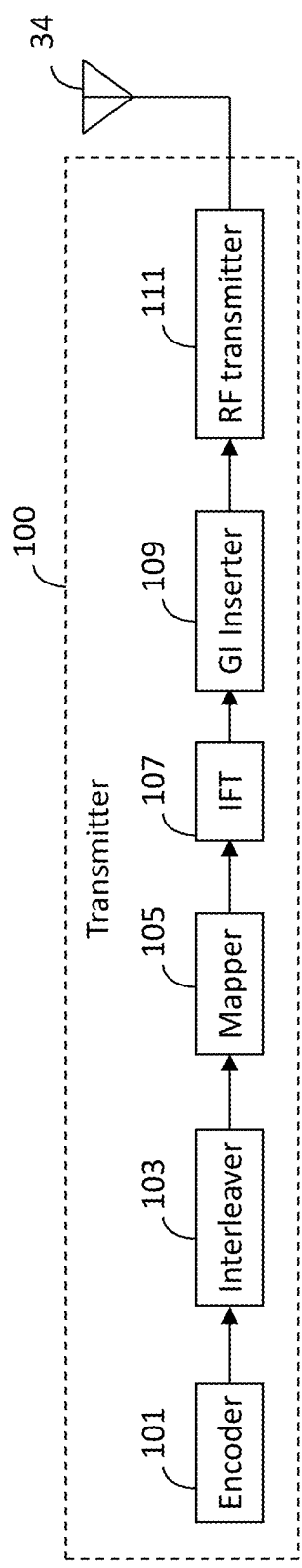
FIG. 6 shows a block diagram of a transmitter in accordance with an embodiment.

FIG. 6 shows a block diagram of a transmitter in accordance with an embodiment.

Figure 7:
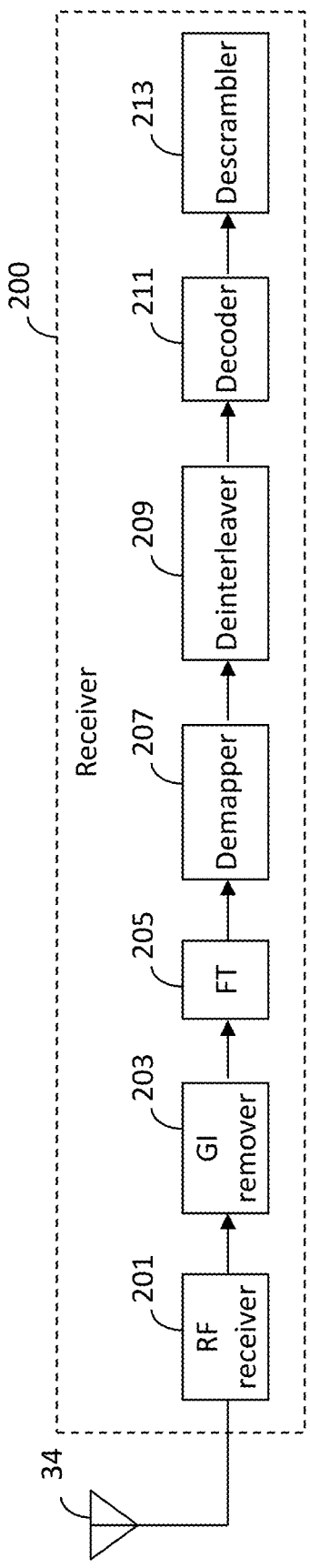
FIG. 7 shows a block diagram of a receiver in accordance with an embodiment.

Referring to FIG. 7, the transmitter 100 may include an encoder 101, an interleaver 103, a mapper 105, an inverse Fourier transformer (IFT) 107, a guard interval (GI) inserter 109, and an RF transmitter 111.

The encoder 101 may encode input data to generate encoded data. For example, the encoder 101 may be a forward error correction (FEC) encoder. The FEC encoder may include or be implemented as a binary convolutional code (BCC) encoder, or a low-density parity-check (LDPC) encoder.

The interleaver 103 may interleave bits of encoded data from the encoder 101 to change the order of bits, and output interleaved data. In some embodiments, interleaving may be applied when BCC encoding is employed.

The mapper 105 may map interleaved data into constellation points to generate a block of constellation points. If the LDPC encoding is used in the encoder 101, the mapper 105 may further perform LDPC tone mapping instead of the constellation mapping.

The IFT 107 may convert the block of constellation points into a time domain block corresponding to a symbol by using an inverse discrete Fourier transform (IDFT) or an inverse fast Fourier transform (IFFT).

The GI inserter 109 may prepend a GI to the symbol.

The RF transmitter 111 may convert the symbols into an RF signal and transmits the RF signal via the antenna unit 34.

FIG. 7 shows a block diagram of a receiver in accordance with an embodiment.

Referring to FIG. 7, the receiver 200 in accordance with an embodiment may include a RF receiver 201, a GI remover 203, a Fourier transformer (FT) 205, a demapper 207, a deinterleaver 209, and a decoder 211.

The RF receiver 201 may receive an RF signal via the antenna unit 34 and converts the RF signal into one or more symbols.

The GI remover 203 may remove the GI from the symbol.

The FT 205 may convert the symbol corresponding a time domain block into a block of constellation points by using a discrete Fourier transform (DFT) or a fast Fourier transform (FFT) depending on implementation.

The demapper 207 may demap the block of constellation points to demapped data bits. If the LDPC encoding is used, the demapper 207 may further perform LDPC tone demapping before the constellation demapping.

The deinterleaver 209 may deinterleave demapped data bits to generate deinterleaved data bits. In some embodiments, deinterleaving may be applied when BCC encoding is used.

The decoder 211 may decode the deinterleaved data bits to generate decoded bits. For example, the decoder 211 may be an FEC decoder. The FEC decoder may include a BCC decoder or an LDPC decoder. In order to support the HARQ procedure, the decoder 211 may combine a retransmitted data with an initial data.

The descrambler 213 may descramble the descrambled data bits based on a scrambler seed.

Link adaptation (LA) parameters for WLAN systems may be sent as part of the MAC header. The parameters may be carried in an HT control field in the MAC header. Hereinafter, the format of the MAC frame will be described with reference to FIGS. 10A, 10B, 11, 12, and 13.

In order to reduce the latency, the unnecessary overhead traffic or transmission may be removed. For example, WLAN system may support one or more PPDU types with no data field and critical information may be carried in SIG field instead of MAC frame.

The IEEE 802.11 be Extremely High Throughput (EHT) task group is currently developing the next generation Wi-Fi standard to achieve higher data rate, lower latency, and more reliable connection to enhance user experience. One of the key features of Wi-Fi 7 is Multi-Link Operation (MLO). As most current Access points and stations incorporate dual-band or tri-band capabilities, the newly developed MLO feature enables packet-level link aggregation in the MAC layer across a plurality of different PHY links. By performing load balancing according to traffic requirements, MLO can achieve significantly higher throughput and lower latency for enhanced reliability in a heavily loaded network. With MLO capability, a Multi-Link Device (MLD) includes multiple "affiliated" devices to the upper logical link control (LLC) layer, allowing concurrent data transmission and reception in multiple channels across a single or multiple frequency bands including, for example, 2.4 GHz, 5 GHz and 6 GHz.

Hereinafter, the multi-link operation in accordance with an embodiment will be described with reference to FIG. 8 and FIG. 9.

Figure 8:
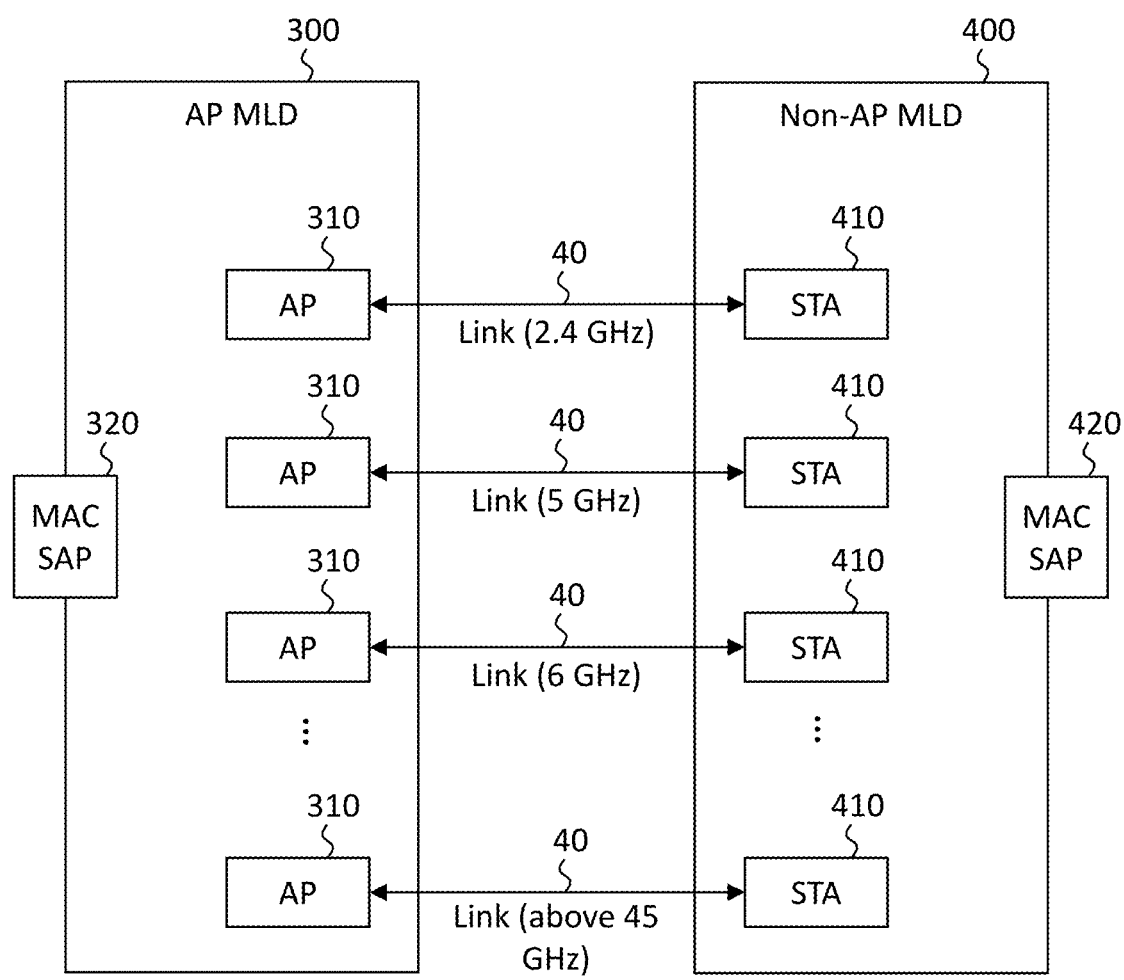
FIG. 8 shows a block diagram including an AP MLD and a Non-AP MLD for an exemplary multi-link operation in accordance with an embodiment.

FIG. 8 shows a block diagram including an AP MLD and a Non-AP MLD for an exemplary multi-link operation in accordance with an embodiment.

As shown in FIG. 8, the AP MLD 300 may be associated with the non-AP MLD 400 for the MLO. The AP MLD 300 and the non-AP MLD 400 may be the electronic device 30.

The AP MLD 300 may include a plurality of affiliated APs 310 and an MAC service access point (MAC SAP) 320. Each affiliated AP 310 may include a PHY interface to the wireless medium. Each affiliated AP 310 may have its own MAC address corresponding to a lower MAC address. The MAC address of each affiliated AP of the AP MLD 300 may be different from MAC addresses of any other affiliated APs of the AP MLD 300. The AP MLD 300 may have an MLD MAC address corresponding to an upper MAC address. The affiliated APs 310 may share the single MAC SAP 320 and communicate with a higher layer (Layer 3 or network layer) through the MAC SAP 320. In some embodiments, the affiliated APs 310 may share a single IP address.

The non-AP MLD 400 may include a plurality of affiliated STAs 410 and an MAC SAP 420. Each affiliated STA 410 may include a PHY interface to the wireless medium. Each affiliated STA 410 may have its own MAC address corresponding to a lower MAC address. The MAC address of each affiliated STA of the non-AP MLD 400 may be different from MAC addresses of any other affiliated STAs 410 of the non-AP MLD 400. The non-AP MLD 400 may have a MLD MAC address corresponding to an upper MAC address. The affiliated STAs 410 may share the single MAC SAP 420 and communicate with a higher layer (Layer 3 or network layer) through the MAC SAP 420. In some embodiments, the affiliated STAs 410 may share a single IP address.

In some embodiments, a plurality of affiliated APs 310 is associated with a respective one of a plurality of links 40 and a plurality of affiliated STAs 410 is associated with a respective one of the plurality of links 40. The plurality of links 40 are associated with a respective one of a plurality of frequency bands, for example, including one or more of 2.4 GHz, 5 GHz, 6 GHz, and a millimeter band. The millimeter band may refer to a band of frequency from 30 to 300 GHz. Radio waves in the millimeter band have wavelengths from ten to one millimeter. For convenience, the millimeter band may refer to a band of frequency above 45 GHz in this disclosure.

In some embodiments, the AP MLD 300 and the non-AP MLD 400 may set up multiple links 40 between their affiliate APs 310 and STAs 410. In some embodiments, there may be, but not limited to, 4 links 40. In this example, the i-th affiliated AP 310 and the i-th affiliated STA 410 may set up i-th link 40 which operates in $N_i$ GHz band, where $N_1=2.4$, $N_2=5$, $N_3=6$, and $N_4=45$ (i=1.4). Each link 40 may enable channel access and frame exchange between the AP MLD 300 and the non-AP MLD 400 independently, which may increase date throughput and reduce latency.

Figure 9:
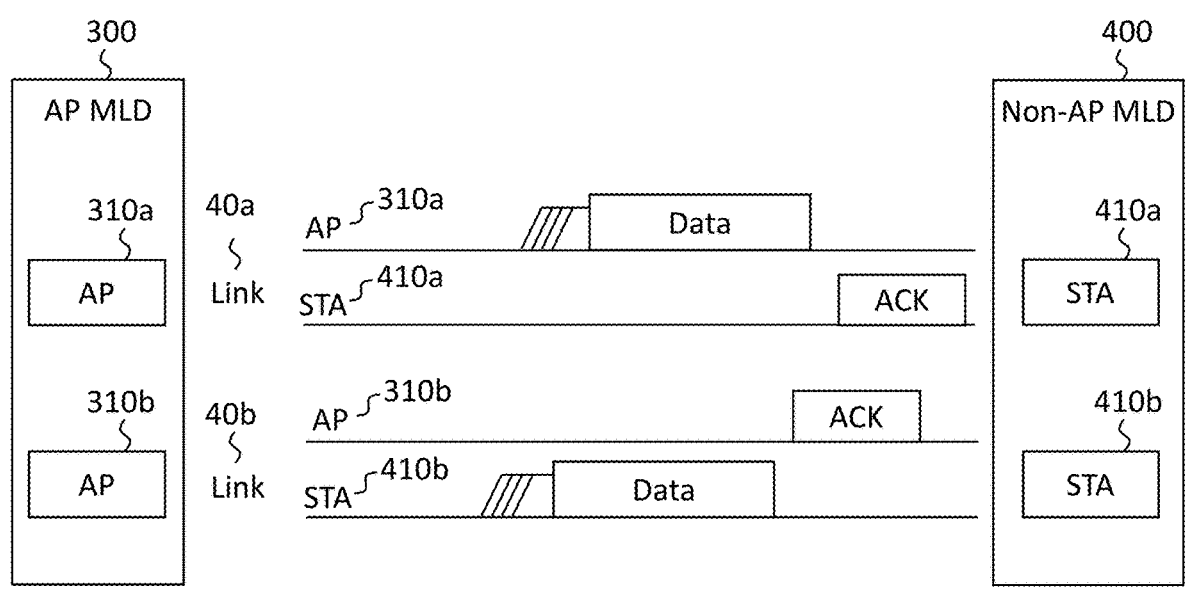
FIG. 9 shows an MLO with two links in accordance with an embodiment.

FIG. 9 shows an MLO with two links in accordance with an embodiment.

Wi-Fi devices may connect to a single link and switch the link between 2.4 GHz, 5 GHz and 6 GHz bands. However, a switching overhead or delay of up to 100 ms may occur when Wi-Fi devices switch their link. Therefore, MLO may be highly desirable for real-time applications like video calls, wireless VR headsets, cloud gaming and other latency-sensitive applications because MLDs may maintain two or more links. As shown in FIG. 9, the AP MLD 300 includes a first AP 310a and a second AP 310b and the non-AP MLD 400 includes a first STA 410a and a second STA 410b. A first link 40a is established between the first AP 310a and the first STA 410a. A second link 40a is established between the second AP 310b and the second STA 410b.

The IEEE 802.11be draft specification defines different channel access methods according to two transmission modes: asynchronous and synchronous modes. Under asynchronous transmission mode, MLDs may asynchronously transmit frames across multiple links without aligning starting times of frames as shown in FIG. 9. Under synchronous transmission mode, the starting times are aligned across the links. In either mode, the links may have their own primary channel and parameters, including Packet Protocol Data Unit (PPDU), Modulation and Coding Scheme (MCS), Enhanced Distributed Channel Access (EDCA), etc.

As described above, a Multi-link Device (MLD) supporting multi-link operation (MLO) is defined in the WLAN. When the MLD operates the MLO, the MLD may set up multi links and each link may use a different frequency band. For example, the bands that can be used in MLO may include one or more of 2.4 GHz, 5 GHz, and 6 GHz. As Wi-Fi technology develops, the use cases that must satisfy various and high-level requirements are being considered. For example, one of the methods to satisfy these requirements is to expand to a wider spectrum. To realize the wider spectrum, it is possible to additionally utilize a frequency band which is, for example but not limited to, above 45 GHz, called the millimeter wave band (mmWave band) in addition to the existing 2.4 GHz, 5 GHz, and 6 GHz frequency bands.

Figure 10:
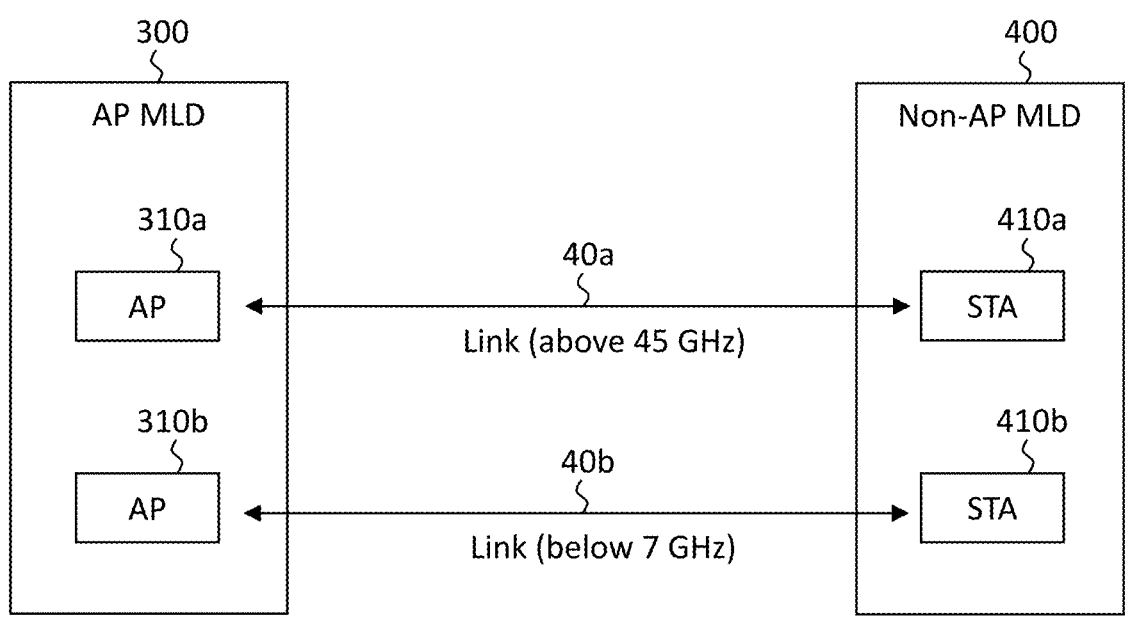
FIG. 10 shows a block diagram including an AP MLD and a Non-AP MLD supporting the millimeter wave band in accordance with an embodiment.

FIG. 10 shows a block diagram including an AP MLD and a Non-AP MLD supporting the millimeter wave band in accordance with an embodiment.

As shown in FIG. 10, the AP MLD 300 may be associated with the non-AP MLD 400 for the MLO. The AP MLD 300 and the non-AP MLD 400 may be the electronic device 30.

The AP MLD 300 may include, for example, but not limited to, two APs: a first AP 310a and a second AP 310b. The non-AP MLD 400 may include, for example, but not limited to, two STAs: a first STA 410a and a second STA 410b.

The first link 40a and the second link 40b may be established between the AP MLD 300 and the non-AP MLD 400. The first AP 310a affiliated with the AP MLD 300 and the first STA 410*a* affiliated with the non-AP MLD 400 may be connected by the first link 40*a* using the frequency band above 45 GHz, and the second AP 310*b* affiliated with the AP MLD 300 and the second STA 410*b* affiliated with the non-AP MLD 400 may be connected by the second link 40*b* using the frequency band below 7 GHz.

Based on characteristics of the mmWave frequency band, the pathloss in mmWave is one of significant factors compared to below 7 GHz band because the mmWave wavelength is too short. Therefore, in order to perform wireless communication through the mmWave band, beamforming training between a transmitter and a receiver may be preceded. In some embodiments, each of the transmitter and receiver may be either the AP or the non-AP STA.

Hereinafter, a beamforming training process will be described with reference to FIG. 11 and FIG. 12.

Figure 11:
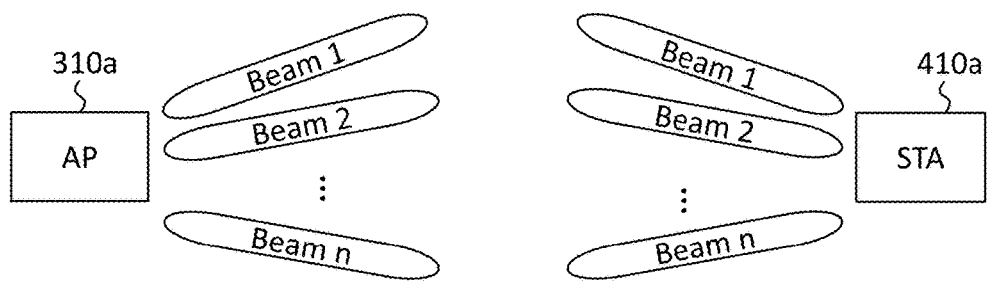
FIG. 11 shows conceptual beams formed between two STAs in accordance with an embodiment.

FIG. 11 shows conceptual beams formed between two STAs in accordance with an embodiment.

As shown in FIG. 11, the first AP 310*a* creates n beams and transmits signals through the beams. The first STA 410*a* receives signals through the beams. In some embodiments, each of the first AP 310*a* and the first STA 410*a* may be either the AP or the non-AP STA.

Figure 12:
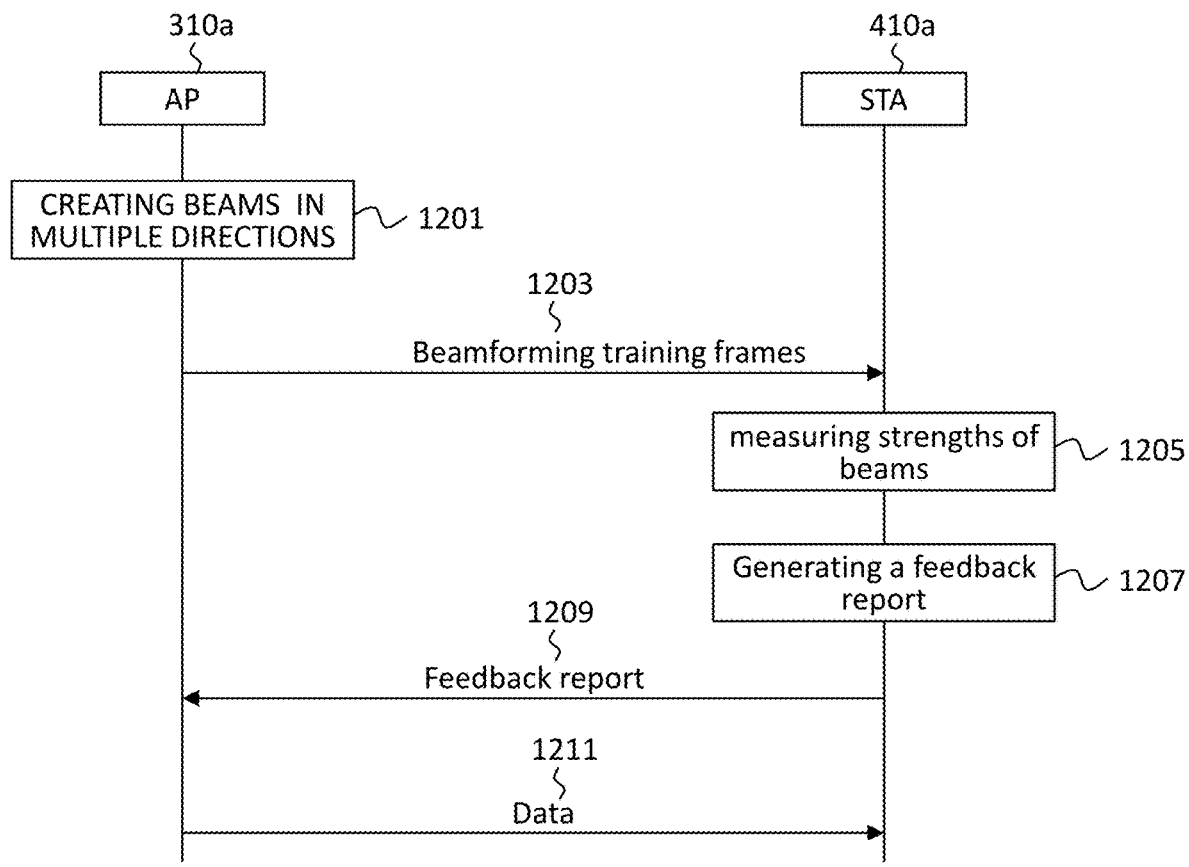
FIG. 12 is a ladder diagram showing the beamforming training procedure in accordance with an embodiment.

FIG. 12 is a ladder diagram showing the beamforming training procedure in accordance with an embodiment.

When the first AP 310*a* wants to do TX beamforming training to transmit data to the first STA 410*a*, the first AP 310*a* may initiate a channel sounding procedure. In operation 1201, the first AP 310*a* creates beams in multiple directions which are indicated by the index from 1 to n.

In operation 1203, the first AP 310*a* may sequentially transmit training signals through the n beams. In some embodiments, the training signals may be a Null Data Packet.

In operation 1205, the first STA 410*a* may receive the signals transmitted by the first AP 310*a* through the beams and measure the strength of received power of each beam. In some embodiments, the first STA 410*a* may determine which beam has the highest strength among the measured beams.

In operation 1207, the first STA 410*a* may generate beamforming feedback report information. In operation 1209, the first STA 410*a* may transmit a beamforming feedback report frame including beamforming feedback report information about the beams to the first AP 310*a*.

In operation 1211, the first AP 310*a* may transmit a data frame to the first STA 410*a* through one of the beams in the mmWave band based on information on the beam reported by the first STA 410*a*. In some embodiments, the first STA 410*a* may select one of the beams having the highest strength among the n beams and transmit data frame through the selected beam.

When wireless communication is performed using the beamforming in the mmWave band, the throughput can be greatly increased, but the time required to complete the beamforming training procedure may cause delay and latency.

Hereinafter, the efficient method for improving the beamforming training procedure in the mmWave band will be described.

Figure 13:
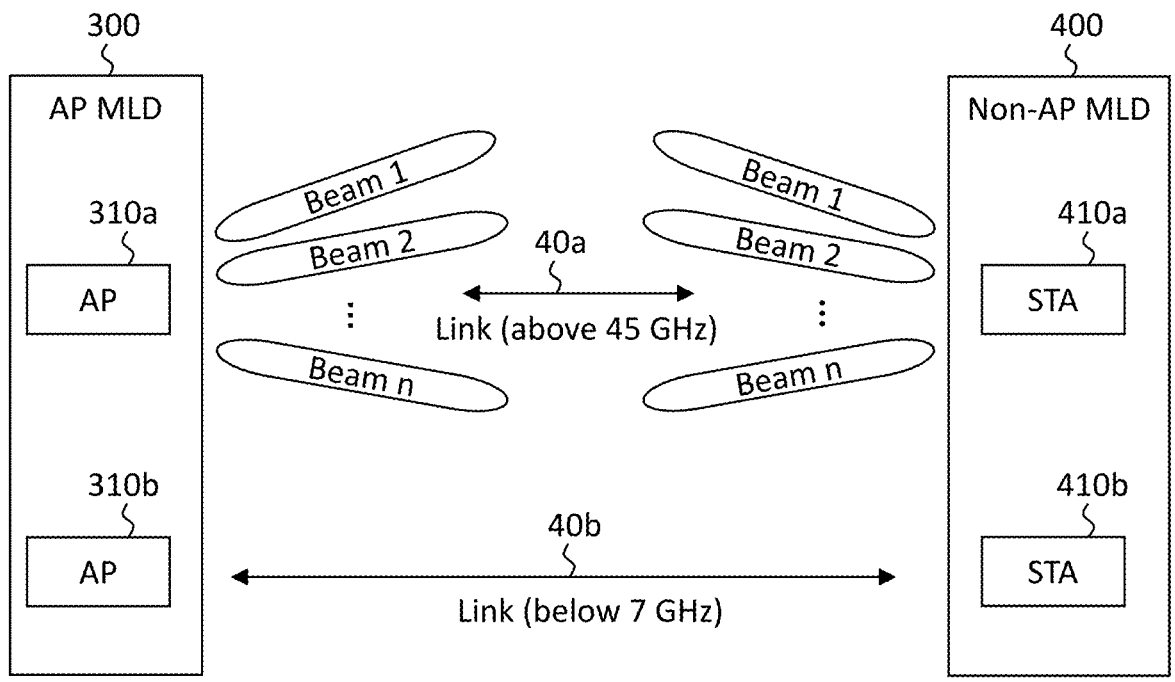
FIG. 13 is a conceptual diagram showing a beamforming training procedure in accordance with an embodiment.

FIG. 13 is a conceptual diagram showing a beamforming training procedure in accordance with an embodiment.

As shown in FIG. 13, when at least one of the AP MLD 300 and the non-AP MLD 400 have data to be transmitted between the AP MLD 300 and the non-AP MLD 400 and the link 40*b* has been enabled, the data may be transmitted between the AP MLD 300 and the non-AP MLD 400 via the link 40*b* using the band below 7 GHz without waiting for the completion of the beamforming training procedure for the link 40*a* using the mmWave band. At the same time, even when the link 40*b* has been enabled, the beamforming training procedure may be performed in the band above 45 GHz. Once the beamforming training procedure is completed in the mmWave band, data transmission and reception can be continued through the link 40*a* using the mmWave band as well as the link 40*b*. Therefore, it is possible to reduce data transmission delay or latency resulting from the required time for beamforming training procedure.

In some embodiments, each of the first AP 310*a*, the second AP 310*b*, first STA 410*a*, and the second STA 410*b* may be either the AP or the non-AP STA.

Figure 14:
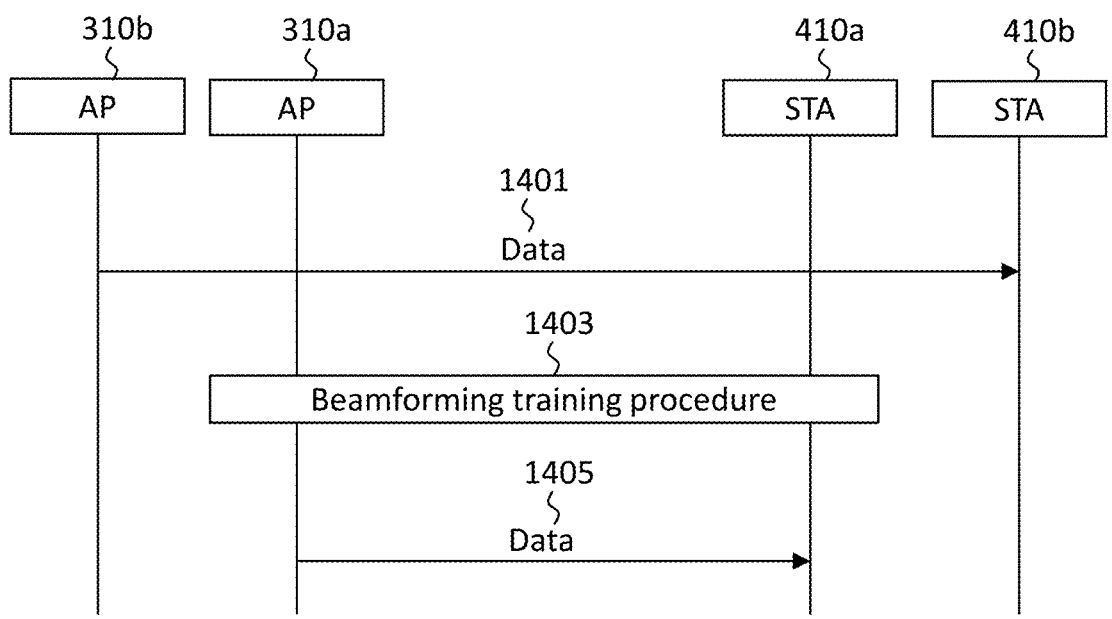
FIG. 14 is a ladder diagram showing a beamforming training procedure in accordance with an embodiment.

FIG. 14 is a ladder diagram showing a beamforming training procedure in accordance with an embodiment.

When at least one of the AP MLD 300 and the non-AP MLD 400 have data to be transmitted between the AP MLD 300 and the non-AP MLD 400 and the link 40*b* has been enabled, the AP MLD 300 may request the second AP 310*b* to transmit a data frame including the received data to the non-AP MLD 400 via the link 40*b*. In operation 1401, the second AP 310*b* may transmit the data frame including the received data to the second STA 410*b* via the link 40*b* using the band below 7 GHz. In some embodiments, the second STA 410*b* may transmit an acknowledgement frame to the received data frame or a data frame to the second AP 310*b* via the link 40*b* using the band below 7 GHz during the operation 1401.

At the same time, the AP MLD 300 may request the first AP 310*a* to perform the beamforming training procedure with the first STA 410*a*. In operation 1403, even when the link 40*b* has been enabled, the first AP 310*a* may perform the beamforming training procedure with the first STA 410*a* while the second AP 310*b* transmits data to the second STA 410*b*. In some embodiments, the beamforming training procedure may follow the procedure shown in FIG. 12.

After performing the beamforming training procedure, the AP MLD 300 may request the first AP 310*a* to transmit a data frame including the received data to the non-AP MLD 400 via the link 40*a*. In operation 1405, the first AP 310*a* may transmit the data frame including the received data to the first STA 410*a* via the link 40*a* using the band above 45 GHz.

Figure 15:
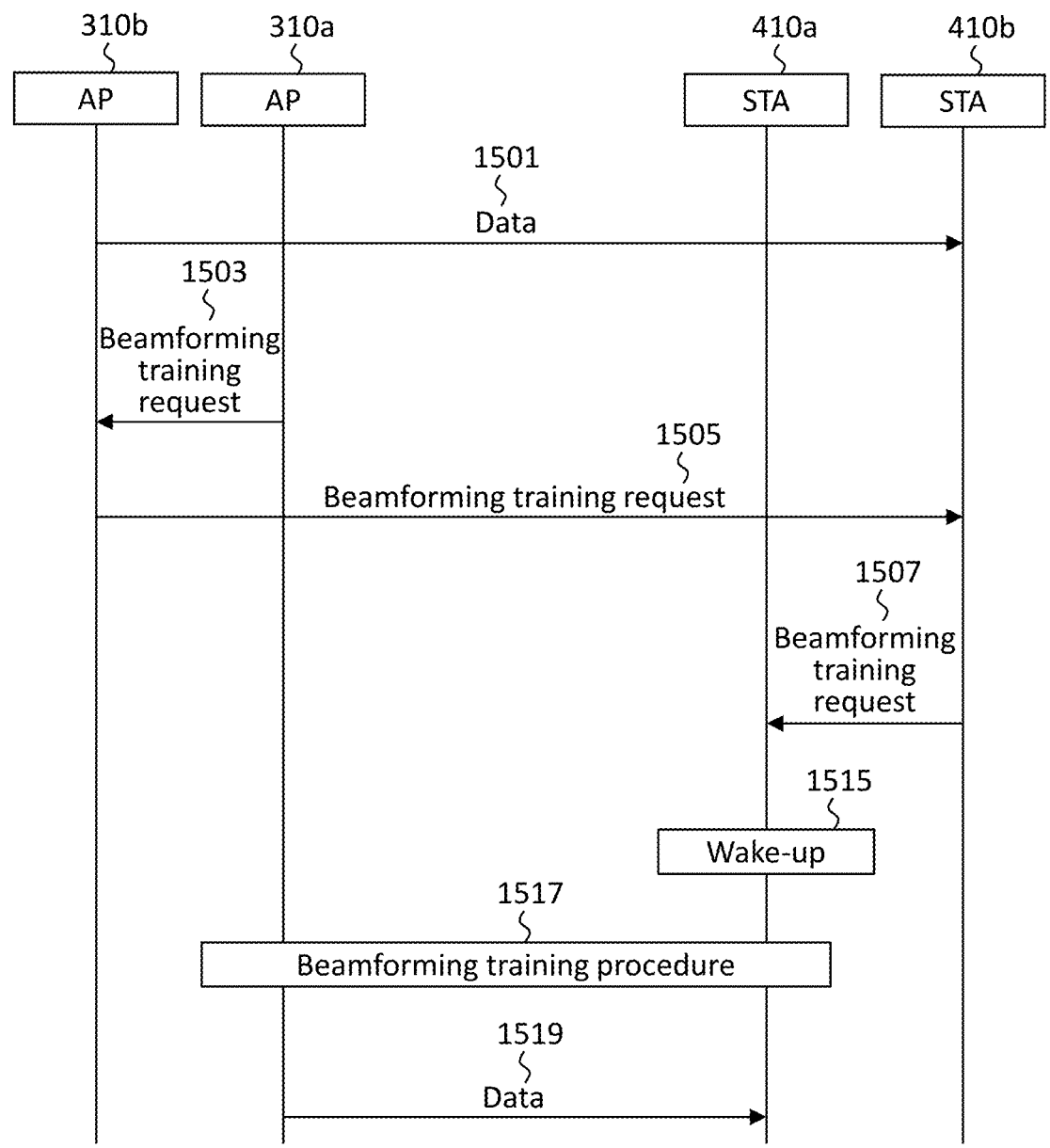
FIG. 15 is a ladder diagram showing a beamforming training procedure in accordance with an embodiment.

FIG. 15 is a ladder diagram showing a beamforming training procedure in accordance with an embodiment.

If at least one of the AP MLD 300 and the non-AP MLD 400 have data to be transmitted between the AP MLD 300 and the non-AP MLD 400, the AP MLD 300 may request the second AP 310*b* to transmit a data frame including the received data to the non-AP MLD 400 via the link 40*b*. In operation 1501, the second AP 310*b* may transmit the data frame including the received data to the second STA 410*b* via the link 40*b* using the band below 7 GHz. In some embodiments, the second STA 410*b* may transmit an acknowledgement frame to the received data frame or a data frame to the second AP 310*b* via the link 40*b* using the band below 7 GHz during the operation 1501.

At the same time, the AP MLD 300 may request the first AP 310*a* to perform the beamforming training procedure with the first STA 410*a*. In operation 1503, if the first AP 310*a* intends to perform beamforming training in the mmWave band, the first AP 310*a* may send a beamforming training request including beamforming training information to the second AP 310*b*. In some embodiments, the beamforming training information may include a start time of the beamforming training procedure between the first AP 310*a* and the first STA 410*a*.

In operation 1505, the second AP 310*b* may transmit a beamforming training request frame including the beamforming training information to the second STA 410*b* via the link below 7 GHz.

In operation 1507, the second STA 410*b* may send a beamforming training request including the beamforming training information to the first STA 410*a*.

In operation 1515, when the received beamforming training information includes the start time of the beamforming training procedure, the first STA 410*a* may wake up at the start time.

In operation 1517, when the received beamforming training information includes the start time of the beamforming training procedure, the first AP 310*a* may start the beamforming training procedure with the first STA 410*a* at the start time. In some embodiments, the first AP 310*a* may perform the beamforming training procedure with the first STA 410*a* while the second AP 310*b* transmits data to the second STA 410*b*. In some embodiments, the beamforming training procedure may follow the procedure shown in FIG. 12.

After performing the beamforming training procedure, the AP MLD 300 may request the first AP 310*a* to transmit a data frame including the received data to the non-AP MLD 400 via the link 40*a*. In operation 1519, the first AP 310*a* may transmit the data frame including the received data to the first STA 410*a* via the link 40*a* using the band above 45 GHz.

Hereinafter, the fast beamforming training procedure in the mmWave band will be described.

Figure 16:
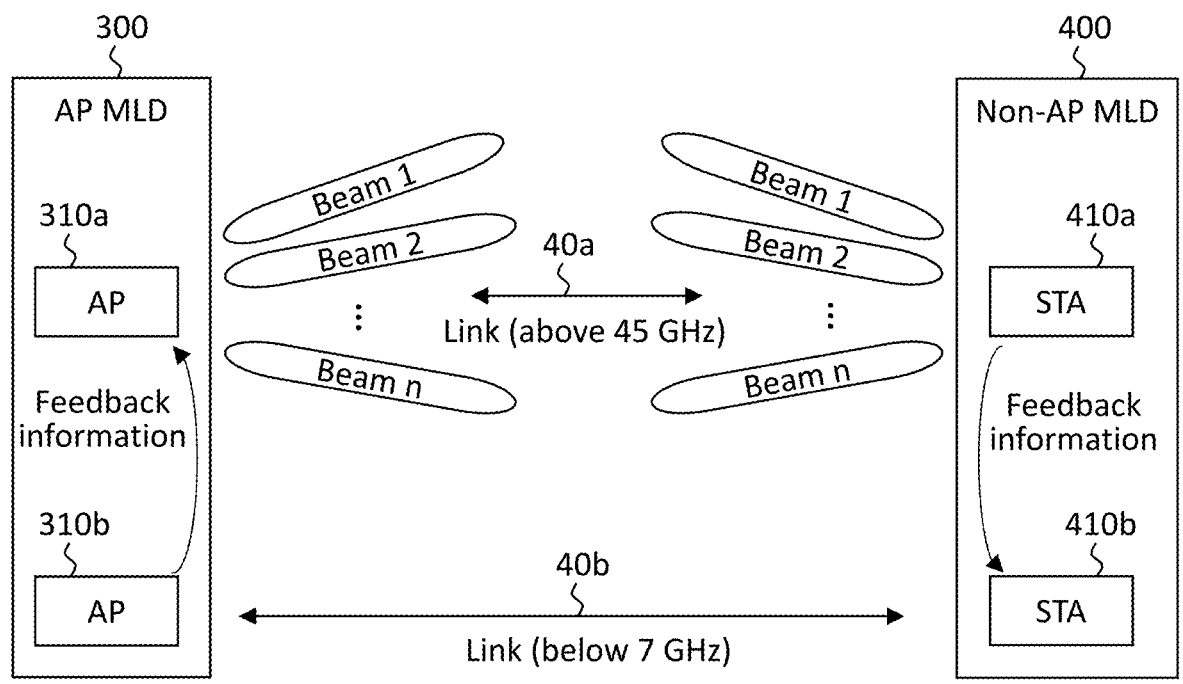
FIG. 16 is a conceptual diagram showing a beamforming training procedure in accordance with an embodiment.

FIG. 16 is a conceptual diagram showing a beamforming training procedure in accordance with an embodiment.

As shown in FIG. 16, even when the link 40*b* has been enabled, the beamforming training procedure may be performed for the link 40*a* using the frequency band above 45 GHz between the first AP 310*a* and the first STA 410*a*. After the first STA 410*a* receives the signals transmitted by the first AP 310*a* through the beams, measure the strength of received power of each beam and generate beamforming feedback report information, the first STA 410*a* may send the beamforming feedback report information to the second STA 410*b* so that the second STA 410*b* transmits the beamforming feedback report information to the AP MLD via the link 40*b* using the frequency band below 7 GHz.

In some embodiments, each of the first AP 310*a*, the second AP 310*b*, first STA 410*a*, and the second STA 410*b* may be either the AP or the non-AP STA.

Figure 17:
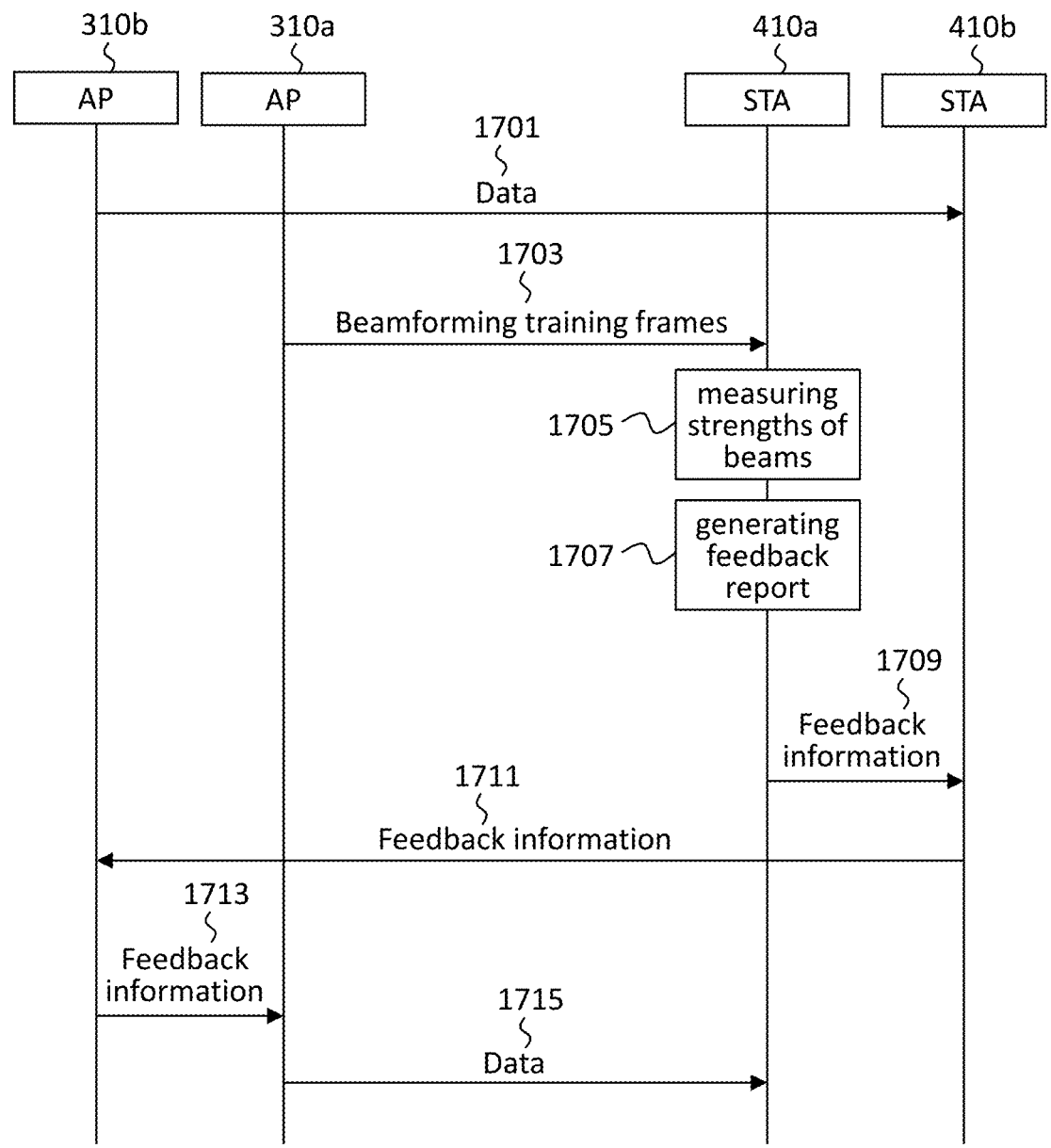
FIG. 17 is a ladder diagram showing a fast beamforming training procedure in accordance with an embodiment.

FIG. 17 is a ladder diagram showing a fast beamforming training procedure in accordance with an embodiment.

If at least one of the AP MLD 300 and the non-AP MLD 400 have data to be transmitted between the AP MLD 300 and the non-AP MLD 400, the AP MLD 300 may request the second AP 310*b* to transmit a data frame including the received data to the non-AP MLD 400 via the link 40*b*. In operation 1701, the second AP 310*b* may transmit the data frame including the data to the second STA 410*b* via the link 40*b* using the band below 7 GHz. In some embodiments, the second STA 410*b* may transmit an acknowledgement frame to the received data frame or a data frame to the second AP 310*b* via the link 40*b* using the band below 7 GHz during the operation 1701.

At the same time, the AP MLD 300 may request the first AP 310*a* to perform the beamforming training procedure with the first STA 410*a*. When the first AP 310*a* wants to do TX beamforming training to transmit data to the first STA 410*a*, the first AP 310*a* may initiate a channel sounding procedure. In operation 1703, the first AP 310*a* may create beams in multiple directions which are indicated by the index from 1 to n and may sequentially transmit training signals through the n beams. In some embodiments, the training signal may be a beamforming training (BFT) frame. In some embodiments, the BFT frame may include information indicating through which beam the BFT frame is transmitted and the information may be an index of the beam. In some embodiments, the BFT frame may use or include a MAC address of the first STA 410*a* as a receiver address (RA) value. In some embodiments, the BFT frame may use or include a broadcast address as the RA value to enable a plurality of non-AP STAs including other non-AP STAs as well as the first STA 410*a* to measure the strength of beam and report the measurement information to the first AP 310*a*.

In operation 1705, the first STA 410*a* may sequentially receive the signals transmitted by the first AP 310*a* through the beams and may measure the strength of received power of each beam. In some embodiments, the first STA 410*a* may determine which beam has the highest strength among the measured beams. In some embodiments, when the BFT frame may use or include a MAC address of the first STA 410*a* as a receiver address (RA) value, only the first STA 410*a* may measure the strength of received power of each beam. In some embodiments, when the BFT frame may use or include a broadcast address as the RA value, the plurality of STAs including the first STA 410*a* may sequentially receive the signals transmitted by the first AP 310*a* through the beams and may measure the strength of received power of each beam.

In operation 1707, the first STA 410*a* may generate beamforming feedback report information. In some embodiments, when the BFT frame may use or include a MAC address of the first STA 410*a* as a receiver address (RA) value, only the first STA 410*a* may generate beamforming feedback report information. In some embodiments, when the BFT frame may use or include a broadcast address as the RA value, the plurality of STAs including the first STA 410*a* may generate beamforming feedback report information.

In operation 1709, the first STA 410*a* may send beamforming feedback report information about the beams to the second STA 410*b*. In some embodiments, the beamforming feedback report information may include at least one of an index for a beam with the strongest reception power, the order of reception power intensity for each beam index, or a P & Q matrix measured by first STA 410*a*.

In operation 1711, the second STA 410*b* may transmit a beamforming feedback report frame including beamforming feedback report information about the beams to the second AP 310*b* through the link 40*b* using the frequency band below 7 GHz.

In operation 1713, the second AP 310*b* may send the beamforming feedback report information about the beams to the first AP 310*a*. In some embodiments, when the BFT frame may use or include a MAC address of the first STA 410*a* as a receiver address (RA) value, the first AP 310*a* may receive beamforming feedback report information from the first STA 410*a*, not from STAs other than the first STA 410*a*. In some embodiments, when the BFT frame may use or include a broadcast address as the RA value, the first AP 310*a* may receive beamforming feedback report information from a plurality of STAs including the first STA 410*a*.

In operation 1715, the first AP 310*a* may transmit a data frame to the first STA 410*a* through one of the beams in the mmWave band based on information on the beam reported by the first STA 410*a*. In some embodiments, the first STA 410*a* may select one of the beams having the highest strength among the n beams and transmit data frame through the selected beam.

According to the embodiments shown in the FIG. 17, the beamforming training may be performed regardless of time even when there is no data to be transmitted. After beamforming training is completed, data may be transmitted through the known best beam which is reported via the link 40*b* using the band below 7 GHz.

As described above, the beamforming training may be performed for the link using the millimeter wave band. However, the beamforming training may be performed for one or more links using other frequency band than the millimeter wave band.

The various illustrative blocks, units, modules, components, methods, operations, instructions, items, and algorithms may be implemented or performed with a processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point (AP) multi-link device (MLD) associated with a non-AP MLD including a first station (STA) and a second STA, the AP MLD comprising:
   a first AP affiliated with the AP MLD and associated with the first STA; and
   a second AP affiliated with the AP MLD and associated with the second STA,
   wherein:
      the first AP sets up a first link with the first STA,
      the second AP sets up a second link with the second STA,
      the first link uses a millimeter wave band,
      the second link uses a frequency band below the millimeter wave band,
      the first AP transmits a beamforming training signal for the first link to the first STA and receives beamforming feedback information from the first STA when the second link is enabled,
      the second AP transmits a beamforming training request includes a start time of a beamforming training procedure for the first link to the second STA via the second link,
      the beamforming training request includes beamforming training information for the first link,
      the beamforming training information includes a start time of a beamforming training procedure for the first link,
      the first AP starts the beamforming training procedure at the start time, and
      the second STA transmits the beamforming training information to the first STA and the first STA wakes up at the start time.

2. The AP MLD of claim 1, wherein the first AP receives the beamforming feedback information from the second AP which receives the beamforming feedback information from the second STA via the second link.

3. The AP MLD of claim 2, wherein the beamforming training signal includes a medium access control (MAC) address of the first STA.

4. The AP MLD of claim 2, wherein the beamforming training signal includes a broadcast address.

5. The AP MLD of claim 1, wherein the first AP transmits the beamforming training signal for the first link to the first STA while the second AP exchanges a data frame with the second STA.

6. A non-access point (AP) multi-link device (MLD) associated with an AP MLD including a first AP and a second AP, the non-AP MLD comprising:
   a first station (STA) affiliated with the non-AP MLD and associated with the first AP; and
   a second STA affiliated with the non-AP MLD and associated with the second AP,
   wherein:
      the first STA sets up a first link with the first AP,
      the second STA sets up a second link with the second AP,
      the first link uses a millimeter wave band,
      the second link uses a frequency band below the millimeter wave band, and
      the first STA receives a beamforming training signal for the first link from the first AP and transmits beamforming feedback information to the first AP when the second link is enabled,
      the second STA receives a beamforming training request for the first link from the second AP via the second link,
      the beamforming training request includes beamforming training information for the first link,
      the beamforming training information includes a start time of a beamforming training procedure for the first link,
      the first STA starts the beamforming training procedure at the start time, and
      the second STA transmits the beamforming training information to the first STA and the first STA wakes up at the start time.

7. The non-AP MLD of claim 6, wherein the first STA sends the beamforming feedback information to the second STA which transmits the beamforming feedback information to the second AP via the second link.

8. The non-AP MLD of claim 7, wherein the beamforming training signal includes a medium access control (MAC) address of the first STA.

9. The non-AP MLD of claim 7, wherein the beamforming training signal includes a broadcast address.

10. The non-AP MLD of claim 6, wherein the first STA receives the beamforming training signal for the first link from the first AP while the second STA exchanges a data frame with the second AP.

* * * * *